(12) United States Patent
Lee

(10) Patent No.: US 6,584,140 B1
(45) Date of Patent: Jun. 24, 2003

(54) SPECTRUM EFFICIENT FAST FREQUENCY-HOPPED MODEM WITH COHERENT DEMODULATION

(75) Inventor: Paul K. Lee, Lexington, MA (US)

(73) Assignee: Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 09/235,988

(22) Filed: Jan. 22, 1999

(51) Int. Cl.[7] ............ H04B 1/69; H04B 1/707; H04B 1/713

(52) U.S. Cl. .............. 375/132; 375/261; 375/265; 375/298

(58) Field of Search ................ 375/132, 133, 375/222, 261, 265, 325, 298

(56) References Cited

U.S. PATENT DOCUMENTS 4,914,699 A * 4/1990 Dunn et al. ............ 375/133

OTHER PUBLICATIONS

Paul K. Lee and Jeffrey A. Rudin, "Spectrum Efficient A/J Waveform for 21st Century HF Communication", Oct. 1998, IEEE.*

* cited by examiner

Primary Examiner—Chi Pham
Assistant Examiner—Demetria Williams
(74) Attorney, Agent, or Firm—Daniel J. Long (57) ABSTRACT

A system for increasing data transmission capacity over a wireless mobile link while at the same time providing improved jamming resistance utilizes discrete trellis-coded modulation involving frequency hopping individual symbols, along with encoding the phase of a symbol as a frequency offset to the hopped carrier frequency. This modulation system permits coherent demodulation in which both phase and amplitude of a symbol is robustly decoded and in which each phase of a quadrature amplitude modulated signal is decoded by the detected frequency offset, thus to provide reliable recovery of phase in the demodulation section. The resulting system improves spectrum efficiency and permits fast frequency hopping for improved jamming resistance, with the utilization of frequency offset coding permitting the coherent demodulation that improves the error-rate without the introduction of additional reference bits.

8 Claims, 5 Drawing Sheets

SPECTRUM EFFICIENT FAST FREQUENCY-HOPPED MODEM WITH COHERENT DEMODULATION

GOVERNMENT RIGHTS

The United States Government has a world wide, non-exclusive, non-transferrable, irrevocable, paid-up license to practice or have practiced, for or on behalf of the United States, the subject invention.

FIELD OF INVENTION

This invention relates to high speed wireless modems and more particularly to a high data rate modem utilizing fast frequency hopping for each symbol and phase converted to a frequency offset.

BACKGROUND OF THE INVENTION

There is an increasing need to increase data transmission capacity to support rapid dissemination of imagery, video and status information for all types of wireless communication. Although satellite and microwave systems can provide some of this capacity, there is a continuing need to provide connectivity among mobile units.

As discussed by D. L. Herrick and P. K. Lee in an article entitled "Chess: A New Reliable High Speed, HF Radio", MILCOM '96, McLean, Va., October 1996, current military HF radio supports raw data transmission at 4,800 bps. However, with error correction for reliable transmission of data this rate drops to around 2,400 bps or even lower. With the increasing reliance on digital transmission, there is a need to increase the data rate while maintaining current transmission ranges.

Also, because the available bandwidth is limited, the new waveform must have increased spectral efficiency while maintaining compatibility with existing radios. For instance, existing VHF and UHF radios operate on a 25 KHz channel spacing, either single-channel or with a fixed hop rate. For compatibility, it is desired to maintain the same instantaneous bandwidth and a compatible or non-interfering hopping pattern.

In addition to the noise and multipath that are common to both commercial and military systems, the military must also deal with intentional jamming. Published work on advanced modulations and codes generally assumes slow frequency hopping and noncoherent demodulation. Although there was some published work on fast frequency hopping and coherent demodulation, work is limited to performance analysis of an assumed fast frequency hopping and coherent demodulation. No specific techniques have been revealed.

One system for providing coherent communications in a non-coherent frequency hopping system is described in U.S. Pat. No. 5,150,378 in which a known bit sequence is used to achieve coherent demodulation in a slow frequency-hopped system. Note that coherent demodulation refers to the detecting of both amplitude and phase. As described in the patents, in this frequency-hopped system, many symbols are transmitted for each frequency hop. Note that the slow frequency hopping described in this patent permits coherent demodulation. However, this system cannot support fast frequency hop rates. In fast frequency hop, only one symbol is transmitted for each hop. Moreover, the BPSK system described in this patent is not spectrum efficient.

In summary, present wireless modems to date permit only low to medium data rates and then with poor spectrum utilization efficiency, typically equal to or less than 1 bit/s/Hz. Moreover, these modems only support slow frequency hopping. Slow frequency hopping supports either non-coherent demodulation which results in poor performance or repeater jamming; or coherent demodulation requires additional reference bits to improve bit error rates, as discussed in the above patent. In either case, slow frequency hopping is vulnerable to follower or repeater jamming.

SUMMARY OF THE INVENTION

In order to solve the above problems with prior wireless modems, the subject system utilizes a new technique called discrete trellis coded modulation and frequency hops individual symbols to permit fast frequency hopping which permits high data rates with efficient spectrum utilization of 3 to 5 bits/s/Hz. In order to improve the performance of fast frequency hopping, in the subject invention the phase of each symbol is converted to a frequency offset of each frequency hopped symbol. This permits coherent demodulation in which amplitude is detected normally and in which phase is detected in terms of the detected frequency offset. This permits improved error rate performance in the demodulation sector when using fast frequency hopping.

Note that for purposes of the subject invention, data rate performance is measured at bits per second; and spectrum utilization efficiency is measured at bits/second per Hz. Improved performance is defined in terms of bit error rate (BER) versus signal to noise ration (S/N) and in the presence of interference or jamming, measured at dB gain.

Advantages of the subject wireless modem includes high density modulation and coherent demodulation, coupled with fast frequency hopping that results in high spectrum utilization, high data rates, and repeater jamming mitigation.

More particularly, the subject modem employs a new high density signal design called discrete trellis-coded modulation (d-TCM) in which frequency hopping is applied to each symbol of the d-TCM. The encoding also includes applying a frequency offset to each symbol corresponding to its phase. Coherent signal demodulation involving detecting amplitude and frequency offset is employed to achieve strong performance.

The coherent signal demodulation takes advantage of the encoding of the phase of a symbol in terms of a corresponding frequency offset from an apparent carrier frequency to make detection of the phase more robust at the receive side.

The architecture of the d-TCM is based on the quadrature amplitude modulation (QAM) together with trellis coding that forms the conventional TCM. A text on quadrature amplitude modulation is authored by W. Webb and L. Hanzo, entitled "Modern Quadrature Amplitude Modulation", London, UK, Pentech Press, 1994. The distinction between d-TCM and TCM is that each symbol of the former is transmitted at a carrier frequency determined by a controlled key system, with the phase of each symbol being represented by a corresponding frequency offset. On the other hand, conventional trellis-coded modulation is transmitted at a fixed carrier frequency.

As commonly known, conventional TCM waveforms offer spectrum efficiency with attendant potential for high data rates. But, a conventional TCM waveform dwells on a fixed frequency, offering no anti jamming protection. At best, it offers slow frequency hopping that is vulnerable to repeater jamming.

The waveform used by the subject system avoids all the above problems by hopping each TCM symbol over a selected set of discrete frequencies, in one embodiment, with each frequency occupying a predetermined bandwidth, 3 to 6 kHz for HF communications. The bandwidth of 3 or 6 kHz is considered to be consistent with traditional HF channelization. At higher frequency bands, the channel bandwidth can increase to 25 kHz as commonly used for military VHF and UHF radios. In one embodiment, each frequency hopping pattern is controlled by a predetermined pseudorandom (PN) sequence to assure orthogonality of hopping patterns to permit multiple users to share the same frequency band. For a single 64 d-TCM channel, for example, the waveform can achieve raw data rate at 36 kbps at HF. 25 kbps or higher user data rates are achievable after two layers of error correction coding and their associated-interleavers. Powerful error correction codes are included to ensure quality communications. In one embodiment, two layers of error correction coding are included: a (6,5) trellis coding with Viterbi decoder with constraint length equal to seven (K=7) and a (13, 11) Reed-Solomon code. A channel interleaver is included to randomize channel errors.

In the above-described embodiment, much higher data rates are achievable by employing orthogonal frequency hopsets or a higher order d-TCM such as 128 or 256 d-TCM. The anti-jamming capability is derived from a wide bandwidth, 2 MHz for use in HF as an example, that the signals hop over. Through environment sensing, one embodiment of the subject wireless modem employs only those channels that are free of interference for its frequencies to hop on.

In one embodiment, to achieve reliable communications, a training sequence is used to assist signal acquisition and synchronization in which the training sequence is used to calibrate the portion of the symbol amplitude.

As part of the subject invention, coherent signal demodulation is used. Without the coherent demodulation, the system performance is expected to degrade up to 6 dB as compared with an optimal demodulation. A d-TCM symbol contains information in both the signal's amplitude and phase. Signal amplitudes are measured and calibrated with the known preamble signals, thus recovering the information contained in the amplitude. On the other hand, effective encoding and decoding of the phase information does not presently exist, with prior art systems suffering a 6 dB degradation.

In the subject coherent demodulation scheme, phase information in a TCM symbol is encoded by a simple algorithm in which each phase for a symbol is translated into a predetermined frequency offset for each hop channel. For example, one has four possible phases in the d-TCM. Within a 2 MHz HF bandwidth, one has a total of about 333 6-kHz channels, among them, 200 channels are available. If the instantaneous frequency called for by the key stream is $f_0$, for example, by the present algorithm, one can encode phase 1 as an $f_1$, phase 2 as an $f_2$, etc. Here, $f_n = f_0 \pm N \times Wz$, N=1,2,3,4, and Wz is the instantaneous channel bandwidth, 6 kHz in this example. In principle, half of the instantaneous bandwidth is adequate. NxWz is the frequency offset from an apparent carrier frequency, $f_0$, controlled by a key stream. Thus, if the data stream calls for phase 2 to be encoded, a 2xWz frequency offset will be added to or substrated from the carrier frequency such that the apparent carrier frequency plus or minus the 2Wz offset, will actually be transmitted. In the receiver, the search for $f_2$ will follow with a narrow window search.

The subject system thus employs a new high density modulation waveform involving discrete trellis-coded modulation (d-TCM), and fast frequency hopping, 3 to 25 k hops/s depending on the radio's channel bandwidth allocation, with coherent demodulation to achieve both high spectrum efficiency and high performance, frequency reuse and anti-jamming properties. All these features are desirable for the future military or commercial communications, but are unachievable in a single system with current wireless communications technologies.

Note that the subject wireless modem can also be used in other applications and frequency bands where efficient spectrum utilization, high data rate, high performance and immunity to interference and jamming are desired.

In summary, a system for increasing data transmission capacity over a wireless mobile link while at the same time providing improved jamming resistance utilizes discrete trellis-coded modulation involving frequency hopping individual symbols, along with encoding the phase of a symbol as a frequency offset to the hopped carrier frequency. This modulation system permits coherent demodulation in which both phase and amplitude of a symbol is robustly decoded and in which each phase of a quadrature amplitude modulated signal is decoded by the detected frequency offset, thus to provide reliable recovery of phase in the demodulation section. The resulting system improves spectrum efficiency and permits fast frequency hopping for improved jamming resistance, with the utilization of frequency offset coding permitting the coherent demodulation that improves the error-rate without the introduction of additional reference bits.

BRIEF DESCRIPTION OF THE DRAWINGS

These and other features of the Subject Invention will be better understood taken in conjunction with the Detailed Description taken in conjunction with the Drawings of which.

DETAILED DESCRIPTION

Figure 1A:
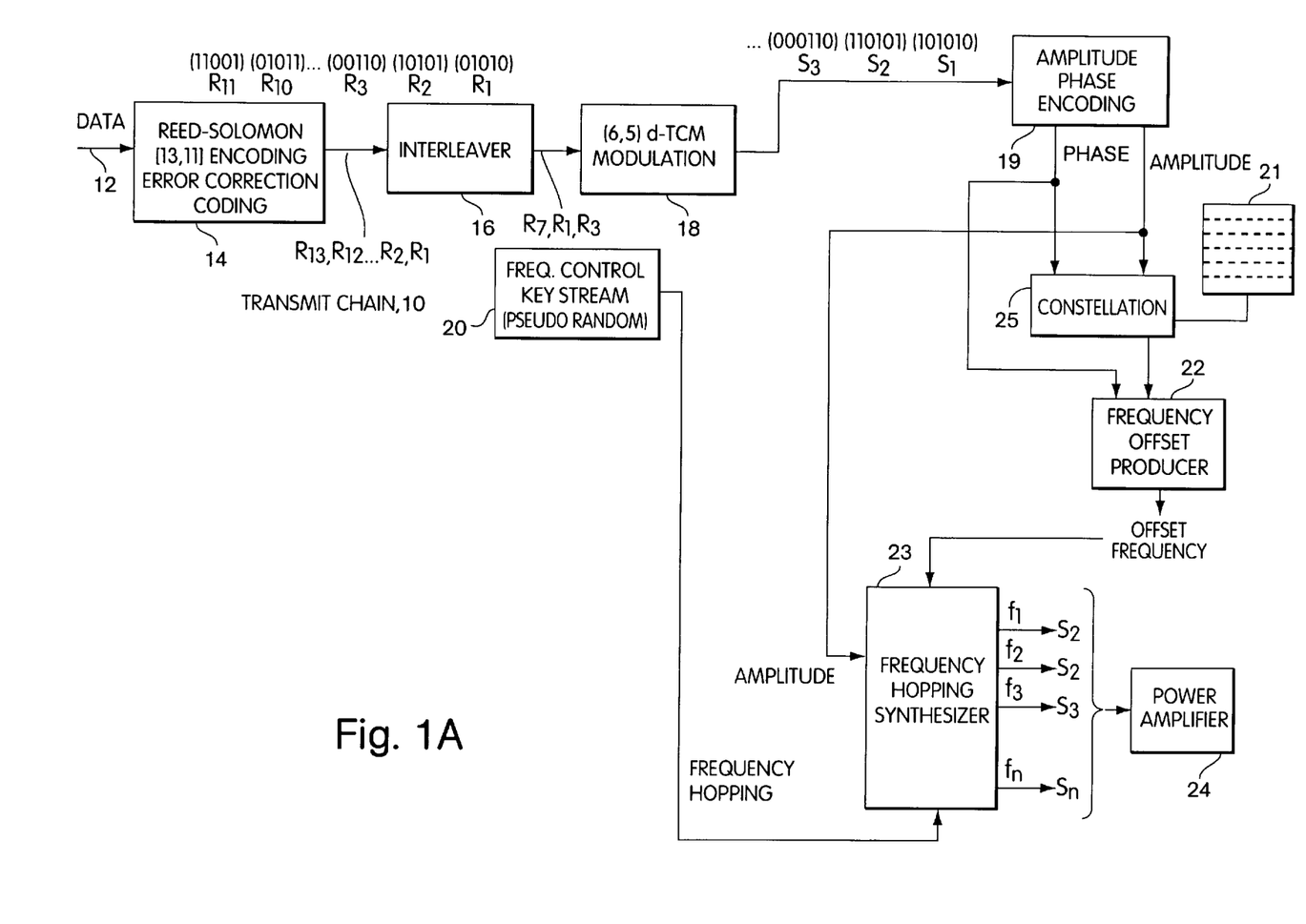
FIG. 1A is a block diagram of the transmit side for the subject modem illustrating the transmit chain and a d-TCM modulator, with a specialized frequency offset provided to encode phase into frequency offsets and with frequency hopping provided for each symbol.

Referring to FIG. 1A, an input data stream 12, in one embodiment, includes a data stream divided up into five bit segments, such that each segment corresponds to a letter of the alphabet, in this case R1, R2, R3 . . . R10, R11. The data stream is provided to a Reed-Solomon encoding unit 14, the purpose of which is to introduce error correction coding. What is meant by error correction coding is that this unit supplies an additional two redundant letters, here labeled R12 and R13. The redundant information which is added to the incoming data stream is utilized in the decoding process as will be described to correct errors when they exist. The output of Reed-Solomon letters unit 14 is supplied to an interleaver 16, which functions as a randomizer, such that the output is a random sequence of Reed-Solomon letters such as, for instance, R3, R1, R7. The purpose of the interleaver and the randomizing process is to optimize the effectiveness of Reed-Solomon code.

The interleaved or randomized Reed-Solomon letters are applied to the subject d-TCM modulation unit 18, which adds an additional bit per letter such that the output is a series of symbols S1, S2, S3, with the added bit per letter functioning as further error correction.

The term discrete d-TCM modulation, as will be seen, refers to the frequency hopping of each of the symbols provided by the TCM modulator. In order to accomplish this, as illustrated at 19, amplitude and phase encoding is provided for each of the d-TCM modulated symbols. In one embodiment, this is easily accomplished by taking the first three bits of the aforementioned symbol as the amplitude and the next three bits as phase.

These symbols can be represented in a constellation 20, which represents the phase and the amplitude of a symbol in 64 separate points as illustrated at 21. This corresponds to 26 possibilities for the six bit symbol, which is the output of modulator 18.

The output of amplitude and phase encoding unit 19 is supplied to either a frequency offset processor 22 or as the amplitude input to frequency hopping/offset synthesizer 23. It will be appreciated that the phase encoding of a symbol from the d-TCM modulator involves assigning a predetermined frequency offset to a predetermined phase. Thus, for instance, in quadrature phase modulation, there is a possibility of four phases and therefore a possibility of four frequency offsets.

It is the purpose of the frequency offset processor to change phrase into a frequency offset. The output of processor 22 is applied to frequency offset synthesizer 23, the input of which is the amplitude signal from encoding unit 19 hopped about a number of frequency channels. The result is that the frequency at which the amplitude portion of the signal is transmitted is determined by the output of frequency control key stream unit 20 as modified by a frequency offset, which in turn is determined by phase. Thus, for instance, as illustrated, symbol S2 is given a carrier frequency $f_1$, with a frequency offset applied to the carrier and determined by the phase of symbol S2.

As will be appreciated in any frequency hop system, a number of different frequency-hopped channels can be utilized to transmit the data so as to resist jamming and increase inscription. What is typically done is that as many as 100 channels may be utilized for the transmission of the information such as common in spread spectrum systems. In order to accommodate the large bandwidth which may be utilized in such a system, frequency control 20 is utilized to switch these channels in a pseudo random manner. Thus, the signal which is the output of frequency/offset synthesizer 23 is transmitted over one of the aforementioned 100 channels in accordance with the frequency control key stream unit 20. However, for each of the channels, there are four frequency offsets for this channel corresponding, as mentioned before, to the four phases that can be assigned to a symbol. The result is that the frequency can be hopped over the 100 channels very quickly, while at the same time providing a frequency offset corresponding to the phase of symbol. The output of frequency hopping/offset synthesizer 23 is applied as illustrated to high power amplifier 24.

Figure 1B:
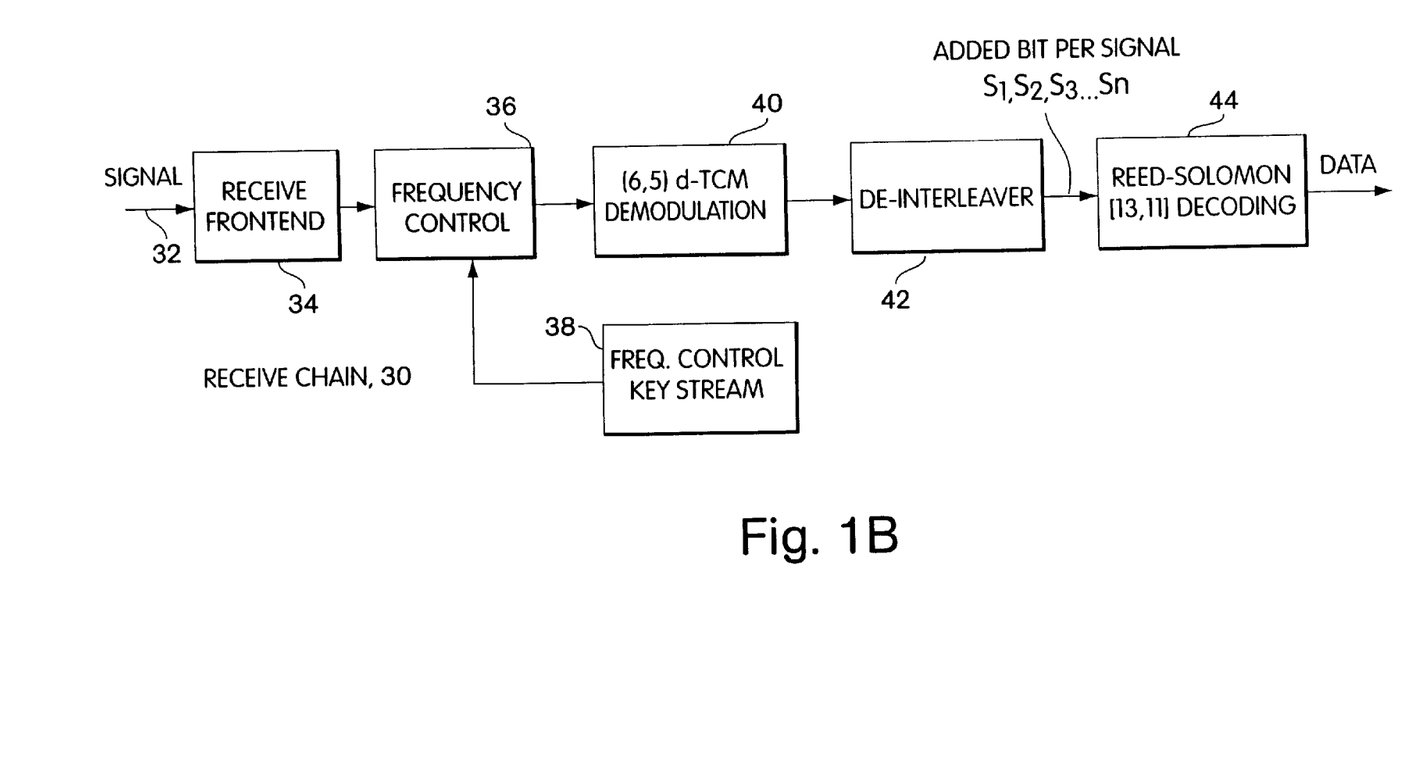
FIG. 1B is a block diagram of the receive side for the subject modem, illustrating coherent demodulation of the received signal.

Referring now to FIG. 1B, at the receive end, the received signal 32 is detected, as illustrated at receive front end 34. A frequency control unit 36 under the control of frequency control stream unit 38, places the input signal into a particular channel in accordance with the key stream. Thereafter, the output is demodulated by a (6,5) d-TCM demodulation unit 40 which as part of its operation detects the frequency offset for the particular channel input to it. The result of having detected the frequency offset, as opposed to the phase, permits robust detection of phase since there is a one-to-one correlation between frequency and phase. The output of d-TCM demodulation unit 40 is thus a number specified by the amplitude portion of the signal and the phase portion of the signal, decoded as the detected frequency offset.

The above constitutes coherent detection of the signal in the sense that both the phase and the amplitude information is recovered. It will be appreciated that in non-coherent systems, all that is detected is the amplitude, which limits the amount of information that can be transmitted, and therefore the speed, bandwidth or information density.

It will be appreciated that each of the symbols is in fact frequency-hopped. It is frequency-hopped because it is hopped between channel to channel. Also frequency-hopped is the frequency offset because within each channel, there are four possible offsets in one embodiment. Furthermore, it will be appreciated that while the subject system has been described in terms of a quadrature amplitude modulation system in which phase is divided into quadrature components, other types of systems are within the scope of this invention in the sense that in some systems, 16 phase angles constitute the phase modulation, whereas 64 or 256 different phases can be encoded in some modern higher order modulation systems.

It will be appreciated that the output of the d-TCM demodulation unit 40 are the symbols $S_2, S_3, S_7 \ldots S_N$ in the order originally prescribed by interleaver 16. The original order must therefore be restored; and de-interleaver 42 restores this order, e.g., $S_1, S_2, S_3 \ldots S_N$. The order, of course, is built into interleaver 16. Therefore, de-interleaver 42 merely is the inverse of the interleaver 16 order.

Thereafter, the output of de-interleaver 42, is supplied to Reed-Solomon decoding unit 44, which provides the data absent the two additional error correcting letters which were originally placed in the data streams by Reed-Solomon encoding unit 14. The function of the Reed-Solomon decoding unit is to correct errors by employing the two extra redundant letters to find those symbols having errors and to correct them in accordance with the well known Reed-Solomon decoding algorithm.

Figure 2:
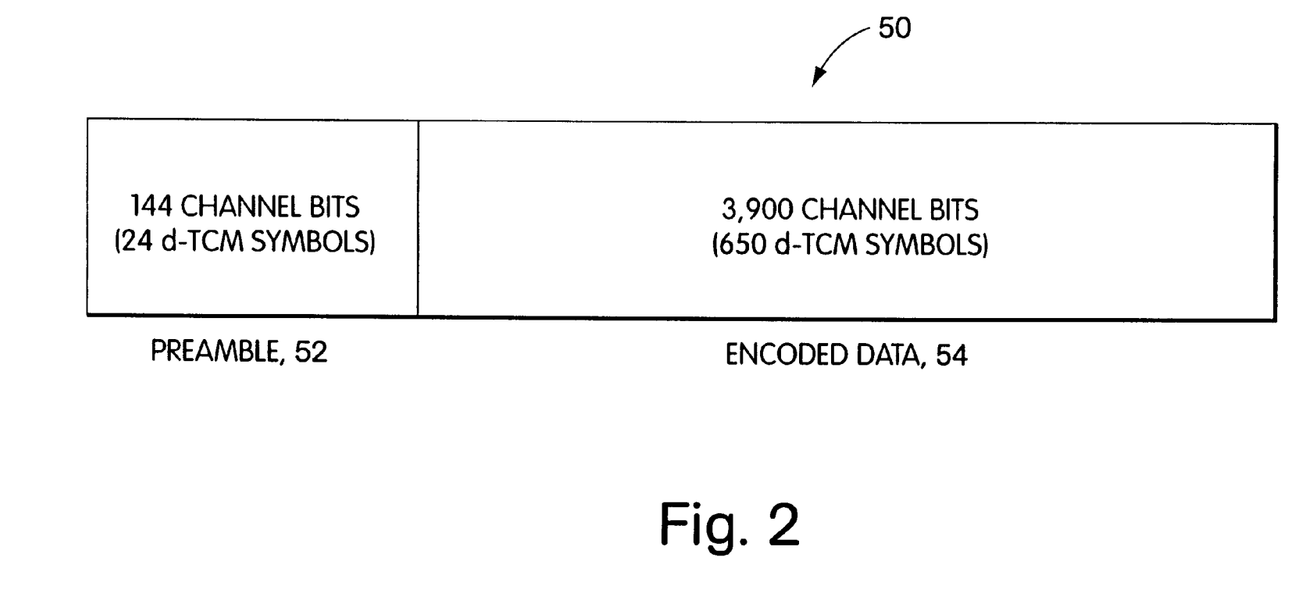
FIG. 2 is a schematic diagram of an example packet format for encoded data and a preamble which proceeds the encoded data packet.

Referring now to FIG. 2, a packet of data 50 is illustrated as having preamble 52, in one case of 144 channel bits comprising 24 d-TCM symbols. The encoded data, as illustrated at 54, includes, in one embodiment, 3,900 channel bits or 650 d-TCM symbols. It is the purpose of the preamble to provide information for amplitude decoding, whereas the phase decoding is done without additional preamble bits. The other function of the preamble is to establish the start of a packet and assist in initial timing and frequency synchronization.

Figure 3:
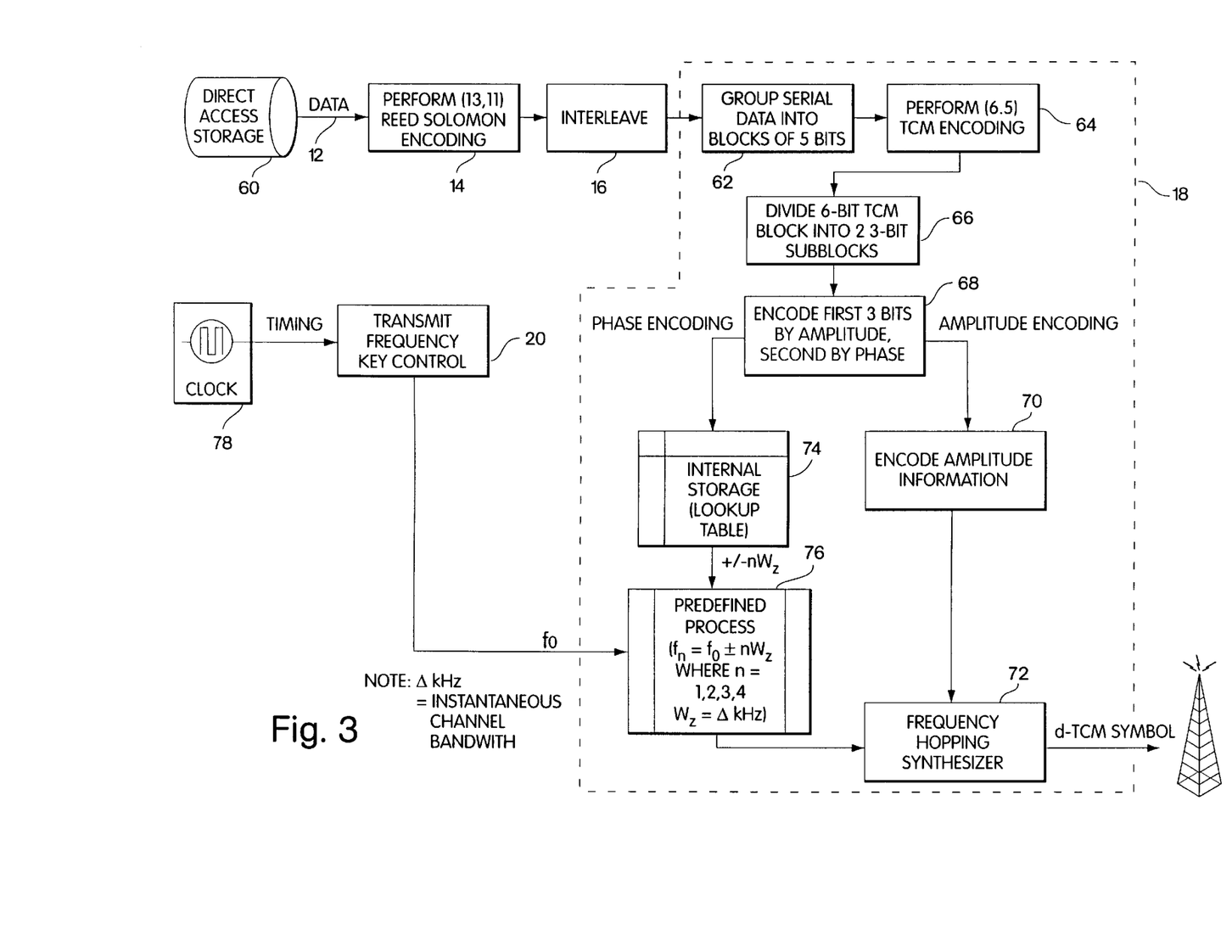
FIG. 3 is a block diagram illustrating the encoding algorithm in which encoded amplitude information is coupled to the d-TCM encoding unit, whereas phase encoding is structured such that for each symbol the particular encoded phase is assigned a particular frequency offset; and, FIG. 4 is a block diagram of the receive decoding algorithm illustrating the estimation of phase depending on the frequency offset of an incoming symbol.

Referring now to FIG. 3, a more general way of viewing the subject invention involves a transmitting algorithm in which data 12 from a direct access storage unit 60 is provided to unit 14 which in one embodiment performs a (13,11) Reed-Solomon encoding. The output of the Reed-Solomon coding is provided to standard interleaver unit 16.

The output of interleaver 16 is applied to the d-TCM modulator 18 which includes, in one embodiment, a unit which groups serial data into blocks of five bits as illustrated at 62. The output of the grouping unit is a applied to a TCM encoding unit 64 which performs a (6,5) TCM encoding. The output of encoding unit 64 is applied as illustrated at 66 to a unit that divides the six bit TCM block into two three bit sub-blocks, which are then coupled to an encoder unit 68 which encodes the first three bits by amplitude and the second three bits by phase.

The amplitude encoding is impressed on the signal at an amplitude information encoding unit 70 which is coupled to a (6,5) TCM encoding unit 72. The phase encoding, on the other hand, is stored in an internal storage look-up table 74 which is output to a processor 76 which arranges the phase information into frequency offsets in accordance with the algorithm noted in this box. Unit 76 is under the control of the transmit frequency key control 20 which is supplied with clock timing by clock 78 to step through the aforementioned frequency hop channels. The phase encoded information is coupled to a frequency hopping synthesizer unit 72 such that the phase information is supplied in terms of predetermined frequency offsets, whereas the amplitude information is supplied conventionally.

The output of encoding unit 72 is the output of frequency hopping synthesizer 23 of FIG. 1.

Figure 4:
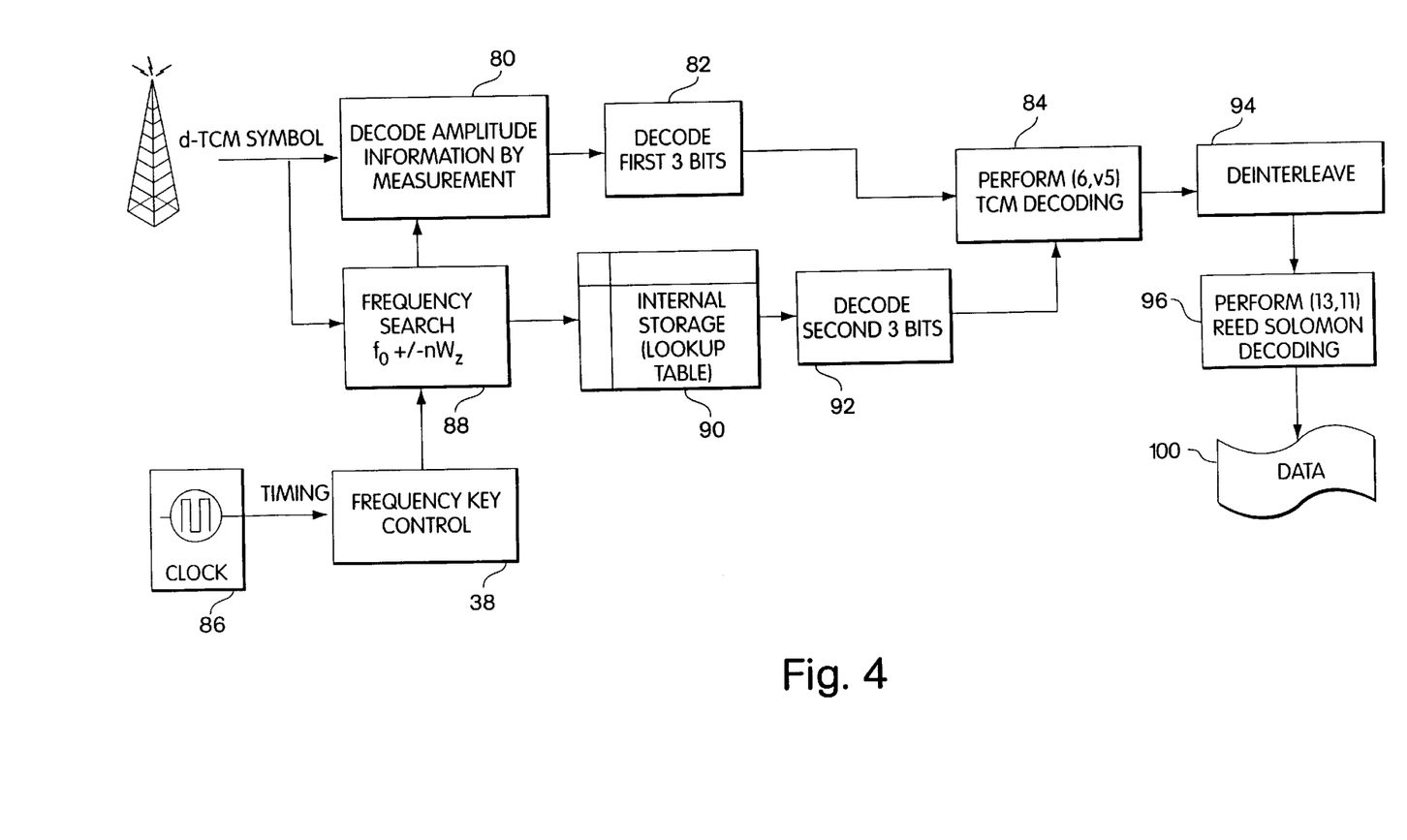

Referring now to FIG. 4, in the receive side and more generally the receive decoding algorithm includes decoding of the d-TCM symbol as illustrated at 80 which decodes the amplitude information by measurement. The output of this unit is coupled to a unit 82 which decodes the first three bits to provide the amplitude information to TCM decoding unit 84. Receive clock 86 provides timing to frequency control key 38 which is coupled to a frequency search unit 88 that performs the search for the phase of the particular symbol in terms of frequency offset. The output of unit 88 is coupled to a look-up table 90 with the output being the decoded second three bits of the symbol in terms of its offset and thus its phase. This is accomplished at 92.

The amplitude and phase information is provided to TCM decoding unit 84, the output of which is supplied to a de-interleaving unit 94, the output of which is supplied to a Reed-Solomon decoding unit 96 that performs a (13,11) Reed-Solomon decoding. The output as illustrated at 100 is the decoded data.

It will be appreciated that the frequency control key provides the unlock for the frequency hopping, with the frequency search unit 88 providing the frequency offset for the particular TCM signal. Knowing the frequency offset, the determination of the phase is simplified, in that it is expected that this particular frequency offset determines a particular phase. This phase is stored in internal look-up table 90 and is decoded so as to provide three bits of information of the phase of the particular symbol. This information is provided to TCM decoding unit 84 which performs TCM decoding conventionally along with the decoded amplitude.

A top level modulation and coherent demodulation algorithm has been presented for transmit encoding and receive decoding algorithm respectively. Note in this algorithm, the amplitude and phase each carries 3 bits of information in one embodiment. This algorithm can be modified to accommodate other-than 3 bits for encoding and decoding the amplitude or phase information, depending on a specific system design. If extremely robust anti-jamming performance is desired, the technique of signal diversity can be employed.

The signal diversity is achieved by repeating the same signal symbol at least three times at different frequencies. Then a majority decision rule is applied to arrive at the final decision. Although diversity offers enhanced anti-jamming, it is achieved at the expense of user data rates.

Traditionally, commercial systems emphasize spectrum efficiency. Because they are used in a controlled environment, they do not need to address the problem of anti-jam. Up to now, designers of military systems have faced a difficult choice: optimize for anti-jam or compromise the communications throughput. The subject system holds a key to solving this problem.

As mentioned above, these are several shortcomings that are inherent in traditional slow hop radios are well known. Specifically, as to susceptibility to intercept and follower jamming, most conventional hoppers are relatively slow and can be easily tracked and jammed by follower jammers. The high hop speed and orthogonal hop sets used by the subject invention makes acquisition and tracking by most high speed jammers difficult.

Note, the subject system solves the problem of providing anti-jamming capability and high data capacity by hopping each symbol embodied in a spectrally efficient QAM signal component over a selected set of discrete frequencies. Each frequency occupies a bandwidth equivalent to a selected hop rate. Current technology permits such hop rate to be as fast at 100 kilo hops/s. In one embodiment, 5 to 20 kilo hops/s (5 to 20 kHz channel utilization bandwidth) is chosen to be consistent with legacy radio channelization. Selection of a hop rate depends on whether anti-jamming or data rate will be emphasized.

In one embodiment, each frequency hopping pattern is controlled by a predetermined pseudo-random (PN) sequence to assure orthogonality of hopping patterns. For a single 64 d-TCM channel operating at 20 khops/s, the subject system can achieve a raw data rate of 120 kbps at 20 kilo hops/s. User data rates at 84.6 kbps or higher are achievable after two layers of error correction coding and their associated-interleavers. Much higher data rates are achievable by employing a higher order QAM constellation such as 128 or 256 QAM.

In summary, the subject system provides a fast frequency hopper for low probability of intercept and detection (LPI/LPD), and a spectrally efficient high data system for commercial communications.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for increasing data transmission capacity over a wireless mobile link, while at the same time providing improved jamming resistance, comprising:
   a data stream;
   a d-TCM modulation unit coupled to said data stream for providing a number of symbols corresponding to said data stream, wherein each of said symbols has a phase and is transmitted at a frequency;
   means coupled to said modulation unit for determining the phase component and the amplitude component for each of said symbols, a frequency offset generating unit coupled to at least the phase component of said phase determining means for producing a signal representing a frequency offset associated with said phase;

a frequency hopping synthesizer coupled to said amplitude component for hopping the carrier frequency utilized to transmit the amplitude component of said symbol and for adding to said carrier frequency the offset frequency from said frequency offset generating unit;

means for amplifying the output of said frequency hopping synthesizer so as to produce a transmitted signal which conveys the amplitude and the phase of said symbol, with the phase of said symbol being conveyed by said frequency offset; and, means for receiving and decoding said transmitted signal to recover the phase and amplitude of a transmitted symbol; and means for offsetting the frequency at which said symbol is transmitted by an amount corresponding to the phase of said symbol.

2. The system of claim 1, wherein said receiving means includes a receiver front end adapted to receive said transmitted signal; and, a symbol amplitude and phase detection unit for detecting the carrier frequency on which said symbol is transmitted, the amplitude of said symbol and the frequency offset of said signal, and for providing as an output the phase and amplitude of said symbol, said phase being that associated with said frequency offset.

3. The system of claim 1 and further including means coupled to said data stream for providing error correction coding.

4. The system of claim 3, wherein said error correction coding includes means for performing Reed-Solomon encoding.

5. The system of claim 4 and further including an interleaver coupled to said Reed-Solomon encoder means for rearranging the order of symbols associated with said Reed-Solomon encoding means.

6. The system of claim 5, wherein said recovery means includes means coupled to said transmitted signal for performing a d-TCM demodulation of said transmitted signal and for de-interleaving the result therefrom.

7. The system of claim 6 and further including a Reed-Solomon decoder coupled to said de-interleaver for performing a Reed-Solomon error correction function.

8. A modulator for use in a wireless data communications system for increasing data transmission capability over a wireless mobile link while, at the same time providing improved jamming resistance comprising:

a data stream;

a discrete Trellis-coded modulator for providing a number of symbols from said data stream, wherein each of said symbols has a phase and is transmitted at a frequency; and, a frequency hopping circuit for transmitting each of said symbols at a different frequency, whereby each of said symbols is frequency hopped; and means for offsetting the frequency at which said symbol is transmitted by an amount corresponding to the phase of said symbol.

* * * * *

UNITED STATES PATENT AND TRADEMARK OFFICE
CERTIFICATE OF CORRECTION

PATENT NO. : 6,584,140 B1  Page 1 of 1
APPLICATION NO. : 09/235988
DATED : June 24, 2003
INVENTOR(S) : Paul K. Lee It is certified that error appears in the above-identified patent and that said Letters Patent is hereby corrected as shown below:

On the title page, in section (73), please delete "Systems Information and Electronic Systems Integration Inc." and insert therefor --BAE Systems Information and Electronic Systems Integration Inc.--

Signed and Sealed this
Twelfth Day of April, 2011

David J. Kappos
*Director of the United States Patent and Trademark Office*